US008125986B2

(12) United States Patent
Narayanaswami et al.

(10) Patent No.: US 8,125,986 B2
(45) Date of Patent: Feb. 28, 2012

(54) METHOD FOR ENABLING SECURE USAGE OF COMPUTERS USING A MECHANISM LOCKDOWN

(75) Inventors: Chandrasekhar Narayanaswami, Wilton, CT (US); Mandayam Raghunath, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1179 days.

(21) Appl. No.: 11/624,992

(22) Filed: Jan. 19, 2007

(65) Prior Publication Data
US 2008/0178281 A1  Jul. 24, 2008

(51) Int. Cl.
H04Q 12/50 (2006.01)
H04L 11/00 (2006.01)
G06F 9/00 (2006.01)
G06F 9/24 (2006.01)
G06F 15/177 (2006.01)
G06F 1/24 (2006.01)

(52) U.S. Cl. ................ 370/360; 713/1; 713/2; 713/100
(58) Field of Classification Search .................. 370/360; 726/17, 2; 713/1, 2, 100
See application file for complete search history.

(56) References Cited

U.S. PATENT DOCUMENTS

| | | | |
|---|---|---|---|
| 5,434,562 A | 7/1995 | Reardon | |
| 5,485,409 A * | 1/1996 | Gupta et al. | 726/25 |
| 5,859,968 A * | 1/1999 | Brown et al. | 726/36 |
| 6,097,385 A | 8/2000 | Robinson | |
| 6,351,817 B1 | 2/2002 | Flyntz | |
| 6,658,562 B1 * | 12/2003 | Bonomo et al. | 713/1 |
| 7,111,321 B1 * | 9/2006 | Watts et al. | 726/2 |
| 2002/0171546 A1 * | 11/2002 | Evans et al. | 340/540 |
| 2003/0169733 A1 * | 9/2003 | Gurkowski et al. | 370/382 |
| 2004/0193925 A1 * | 9/2004 | Safriel | 713/202 |
| 2005/0086523 A1 * | 4/2005 | Zimmer et al. | |
| 2005/0193188 A1 * | 9/2005 | Huang | 713/1 |
| 2005/0204013 A1 * | 9/2005 | Raghunath et al. | 709/217 |
| 2005/0235045 A1 * | 10/2005 | Narayanaswami et al. | 709/217 |
| 2005/0283626 A1 * | 12/2005 | Shikata | 713/300 |
| 2006/0026525 A1 * | 2/2006 | Fischer et al. | 715/741 |
| 2006/0075218 A1 * | 4/2006 | Barragy et al. | 713/100 |
| 2006/0152285 A1 * | 7/2006 | Gustavsson et al. | 330/278 |
| 2007/0094486 A1 * | 4/2007 | Moore et al. | 713/1 |
| 2007/0101118 A1 * | 5/2007 | Raghunath et al. | 713/2 |
| 2007/0112552 A1 * | 5/2007 | Narayanaswami et al. | 703/27 |
| 2007/0113228 A1 * | 5/2007 | Raghunath et al. | 718/1 |
| 2007/0127440 A1 * | 6/2007 | Narayanaswami et al. | 370/352 |
| 2007/0143555 A1 * | 6/2007 | Nemiroff et al. | 711/163 |

(Continued)

*Primary Examiner* — Ayaz Sheikh
*Assistant Examiner* — Tarell Hampton
(74) *Attorney, Agent, or Firm* — Michael J. Buchenhorner; Vazken Alexanian

(57) ABSTRACT

A computer-implemented method for selectively enabling and disabling at least one of a plurality of functions of a host operating system and for selectively enabling and disabling at least one of a plurality of host components includes the following steps: activating a locking mechanism in the host system for disabling system access, wherein the locking mechanism includes switches and component control storage; activating component settings for selectively enabling and disabling components of the system, wherein the component settings are controlled by manipulating the switches; activating system settings for selectively enabling and disabling functions of the system, wherein the system settings are controlled by manipulating the switches; activating system passwords, component passwords and encryption keys; and locking the system according to the selected settings. An information processing system includes a master access control mechanism for enabling and disabling one or more components of the system when the system is in privileged system mode, depending on whether the system boots from internal or external media.

18 Claims, 5 Drawing Sheets

U.S. PATENT DOCUMENTS

| | | |
|---|---|---|
| 2007/0162970 A1* | 7/2007 | Lo .................................. 726/16 |
| 2007/0234380 A1* | 10/2007 | Sahasrabudhe et al. ........ 725/25 |
| 2007/0283094 A1* | 12/2007 | Narayanaswami et al. ... 711/115 |
| 2008/0034405 A1* | 2/2008 | McLean ............................ 726/2 |
| 2008/0046581 A1* | 2/2008 | Molina et al. .................. 709/229 |
| 2008/0046990 A1* | 2/2008 | Narayanaswami et al. ........ 726/9 |
| 2008/0163334 A1* | 7/2008 | Perich et al. ....................... 726/1 |
| 2009/0031403 A1* | 1/2009 | Huang .............................. 726/4 |

* cited by examiner

METHOD FOR ENABLING SECURE USAGE OF COMPUTERS USING A MECHANISM LOCKDOWN

CROSS-REFERENCE TO RELATED APPLICATIONS

Not Applicable.

STATEMENT REGARDING FEDERALLY SPONSORED-RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention disclosed broadly relates to the field of computer security and more particularly relates to the field of portable information storage devices.

BACKGROUND OF THE INVENTION

Many personal computers (PCs) have a key and lock mechanism to enable the owner to lock the machine so that it cannot be opened and the internal hardware configuration altered easily, or parts stolen. Some users employ passwords such as BIOS passwords to prevent the machine from being booted by an unauthorized user. Many PCs also support hard disk passwords to prevent access to the hard disk by unauthorized individuals. Some PC BIOSes (basic input, output systems) have firmware settings that control whether or not the front panel USB ports are enabled.

Known methods for preventing entrance to a PC are well-established, but there are instances where a user may wish to allow a second party to have use of the PC, but does not want to allow the second party to have access to all components and functionality within the PC. In cases such as this, there exists no effective method for selectively disabling functionality and components of a PC while at the same time allowing PC access to a second party. Therefore, there is a need for a method of selectively disabling components to overcome the shortcomings of the prior art.

SUMMARY OF THE INVENTION

Briefly, according to an embodiment of the invention, a computer-implemented method for selectively enabling and disabling at least one of a plurality of functions of a host operating system and for selectively enabling and disabling at least one of a plurality of host components includes the following steps: activating a locking mechanism in the host system for disabling system access, wherein the locking mechanism includes switches and component control storage; activating component settings for selectively enabling and disabling components of the system, wherein the component settings are controlled by manipulating the switches; activating system settings for selectively enabling and disabling functions of the system, wherein the system settings are controlled by manipulating the switches; activating system passwords, component passwords and encryption keys; and locking the system according to the selected settings. An information processing system includes a master access control mechanism for enabling and disabling one or more components of the system when the system is in privileged system mode, depending on whether the system boots from internal or external media A host information processing system according to an embodiment of the invention includes a plurality of components. The system also includes: a processor configured for performing a plurality of functions on the plurality of components of the system, wherein the plurality of components of the system are each enabled with features for allowing the components to be enabled and disabled; a locking mechanism for enabling and disabling at least some of the components of the system, wherein the enabling and disabling can be done by hardware and/or software switches.

According to another embodiment of the invention, a set of controls for an information processing system includes: a set of controlled components wherein one or more of the controlled components can be disabled or enabled when the system is active; and a control mechanism for controlling the components.

BRIEF DESCRIPTION OF THE DRAWINGS

To describe the foregoing and other exemplary purposes, aspects, and advantages, we use the following detailed description of an exemplary embodiment of the invention with reference to the drawings, in which.

DETAILED DESCRIPTION

We discuss a locking mechanism to individually lock down different aspects of the functionality of a computer system or components of the system that perform such functionality so that the owner of the system can allow untrusted (or semi-trusted) visitors to use the owner's system (the host system) in tandem with a portable device. In one embodiment, the portable device contains the computing state of the visitor's personal computing system and is used to also boot the host computer system, as is the case with the "SoulPad" device from IBM.

Figure 1:
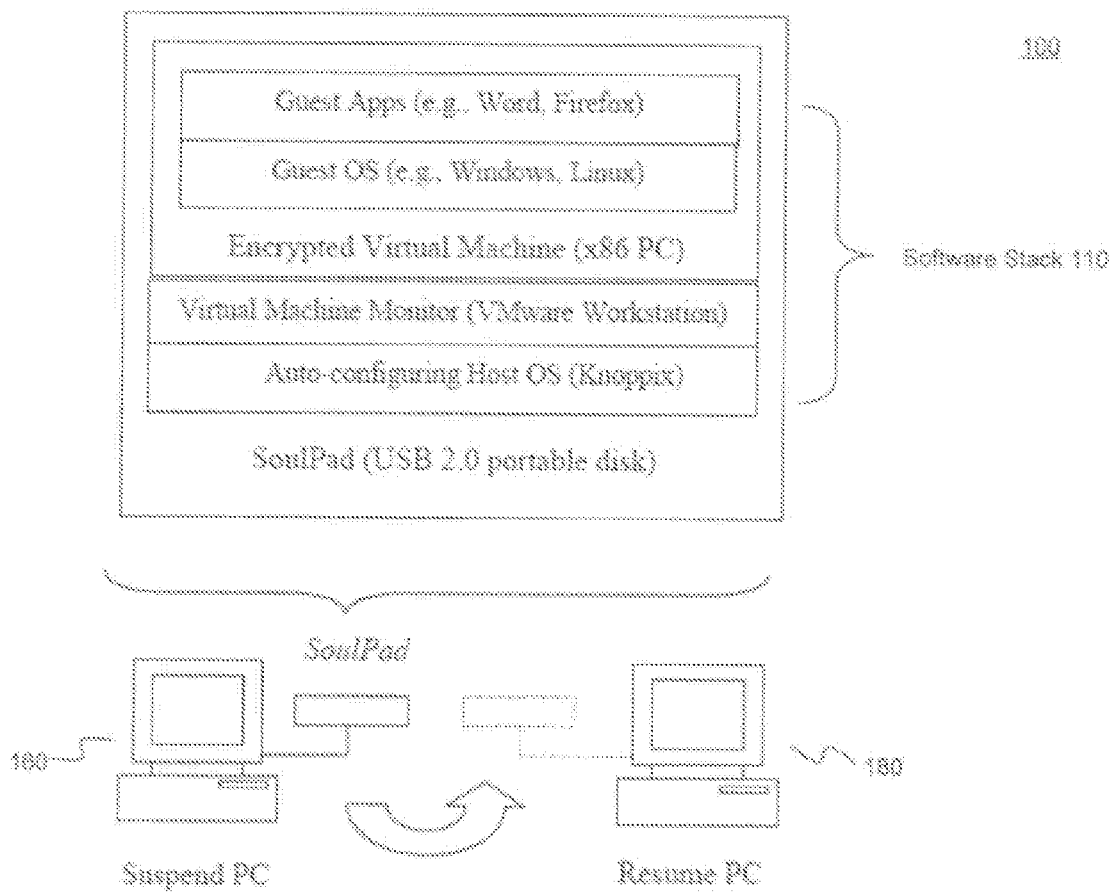
FIG. 1 shows the software stack for an IBM SoulPad, according to the known art.

Referring to FIG. 1 there is shown an illustration of a SoulPad 100. The SoulPad 100 is a portable storage device containing the software stack as shown in FIG. 1. The SoulPad 100 is an example of a portable device which may be used with a host system, according to an embodiment of the invention. The three-layer SoulPad software stack 110 enables a paradigm of mobile computing where a user can suspend his computing environment on one PC 160 (the guest PC) and resume it on another PC 180 (the host PC) that the user may have never worked with before. The software stack 110 comprises the encrypted virtual machine (VM), a virtual machine monitor (VMM), and an auto-configuration of the host's operating system (OS). The encrypted VM comprises the guest's entire computing environment. It is encrypted for security purposes and will need to be decrypted at a later point.

Figure 2:
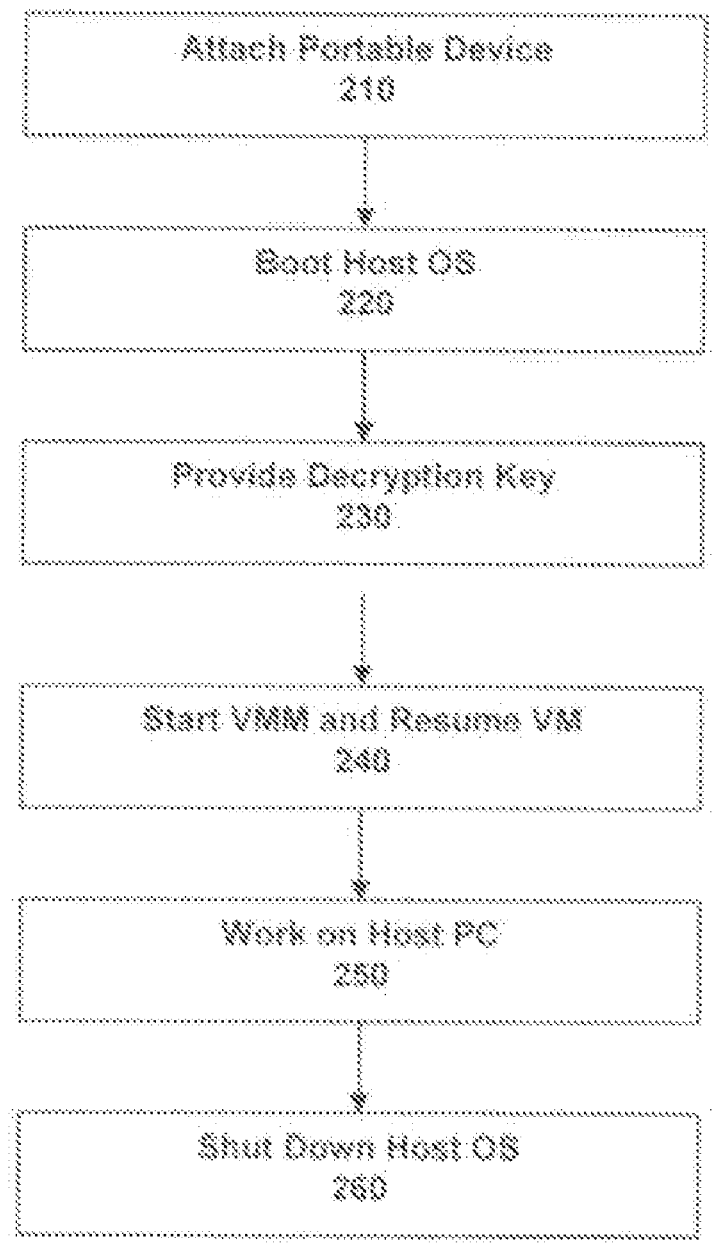
FIG. 2 is a simplified block diagram showing the IBM SoulPad usage sequence, according to the known art.

Referring to FIG. 2 we describe the usage sequence for a portable storage device such as the SoulPad 100. The sequence commences in step 210 when a guest user attaches the device 100 to the host PC 180. It is assumed that the device 100 contains the guest OS and guest applications from the guest PC 160. In step 220 the host PC 180 boots an auto-configuring host OS from the device 100. Note that the guest OS and the host OS may be different systems, as in the example of FIG. 1 where the guest OS is a Windows or Linux based system and the host OS is a Knoppix system. After booting the OS in step 230 the host PC 180 requests a decryption key for security reasons. Once the guest user inputs the key (which can be supplied via USB device), the host PC 180 starts a virtual machine monitor in step 240, and then resumes the suspended virtual machine with the user's entire personal computing environment, which includes the user's files, the user's operating system, installed applications, desktop configuration as well as all running applications and open windows on the host PC's display.

In step 250 the user works on the host PC 180 as though it was the user's own system 160. In fact, the display of the host PC 180 will show the same computing environment the user works with on his/her PC 160, including the user's desktop environment, with all applicable settings. Essentially, the device 100 enables a user to hibernate a PC session to a pocket form-factor device and carry the device to some other PC and resume his session on that PC. The sequence ends at 260 with the user shutting down the host OS and removing the device 100.

We describe embodiments in relation to a portable storage device such as the SoulPad 100 because it has minimal dependencies on PCs that can be used to resume a user session. However, other portable storage devices with minimal dependencies on PCs can be used as well. In specific, PCs are neither required to be network connected, nor are they required to have any pre-installed software. The only requirement is the support of a high speed local connection to a portable device for acceptable suspend/resume times and acceptable runtime performance. Many PC BIOSes support the ability to boot directly from USB devices, simplifying the resume operation to one of connecting the portable device over a USB 2.0 port and instructing the PC BIOS to boot from the USB device. Since the portable device carries the entire personal computing state of a user, it is important that the storage capacity of the device be large enough to hold all of the content that the user needs. Many USB hard disks are based on the same technology as disks on laptop computers, and have similar capacities. Given the popularity of laptop computers, we believe that the capacities of USB hard disks are adequate for a majority of the user population. Due to its small form factor and portability, it is possible that the user may lose his portable device; therefore sensitive data is encrypted on the portable device, namely the virtual machine state, using an AES 128 block cipher or other encryption tool.

The time to resume a suspended session after attaching the portable device to the host PC 180 is about two minutes. About half of this time is for the auto-configuration of the host PC 180 by the host OS. The time required to suspend a running session and walk away from the host PC 180 is about 20 seconds. As disk storage densities increase, portable devices such as media players, mobile phones, and digital cameras are likely to include large capacity storage disks. For example, a number of portable music players already carry 60 GB drives and several cell phones already incorporate 4 GB drives. By adding a software stack such as the SoulPad software stack 110 to any such device, we make it possible for a user to carry his personal computing state using a device that the user would carry anyway, such as an MP3 musical player or a cellular phone. The only trade-off is partitioning of the storage capacity between the portable device software stack and the native function of the device in question.

The characteristics of the portable device model as the focus of our invention are as follows. The visitor, or guest, brings his own operating system image (from his own PC 160) on removable media that he uses to boot up the host owner's PC 180. The host is willing to permit this, but wants to ensure that the visitor (guest) cannot modify any permanent state on the owner's PC 180, and also wants to ensure that the visitor cannot copy or read any data that belongs to the host. An assumption must be made that the visitor is willing to trust the host PC 180 hardware and the BIOS on the host PC 180, but does not need to trust the software on the host's PC 180. This assumption is necessary to be able to boot the host PC 180.

In other embodiments the portable devices may be just USB peripherals that may include storage and attach to the host system 180. In addition, the portable devices could primarily be functional devices that also contain storage. For example, a cell phone, game console, a digital camera, or a music player can fall in this category. Even in this model, the owner of the host system 180 may want to restrict which components of the host system 180 are accessible to the peripheral device 100 attached by the guest.

Figure 3:
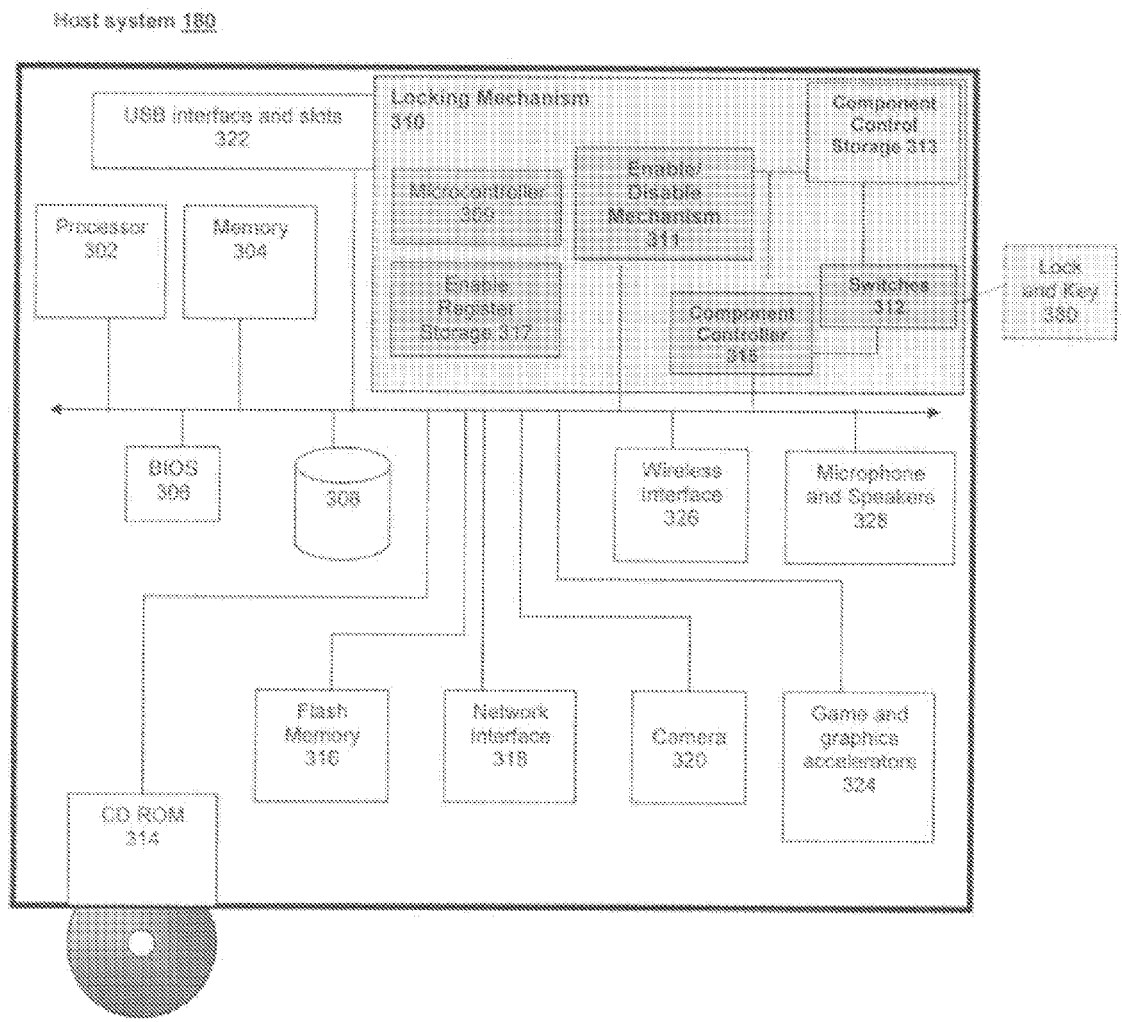
FIG. 3 is a high level block diagram showing an information processing system according to an embodiment of the invention.

Referring to FIG. 3 there is shown a high level block diagram showing a host information processing system (e.g., a personal computer or PC) 180 according to an embodiment of the invention. The system 180 includes a processor 302, a memory 304, a BIOS 306, hard disk 308, and other standard PC components. The system 180 also includes a locking mechanism 310. The locking mechanism 310 includes switches 312 and an enable/disable mechanism 311 that is responsible for enabling or disabling the individual components. Additionally, the locking mechanism includes enable/disable component control storage 313. This storage 313 contains mode settings for the locking mechanism 310. A user would access the component control storage 313 to select a mode for the locking mechanism 310. The locking mechanism 310 also includes a software component controller 315 and a set of physical switches 312, either of which can update the component control storage 313 to specify which components are enabled and which components are disabled. Each component in the host system 180 is allocated a separate storage section in the component control storage area 313. A micro-controller 309 and enable register storage are 317 can also be implemented as part of the component.

Figure 4:
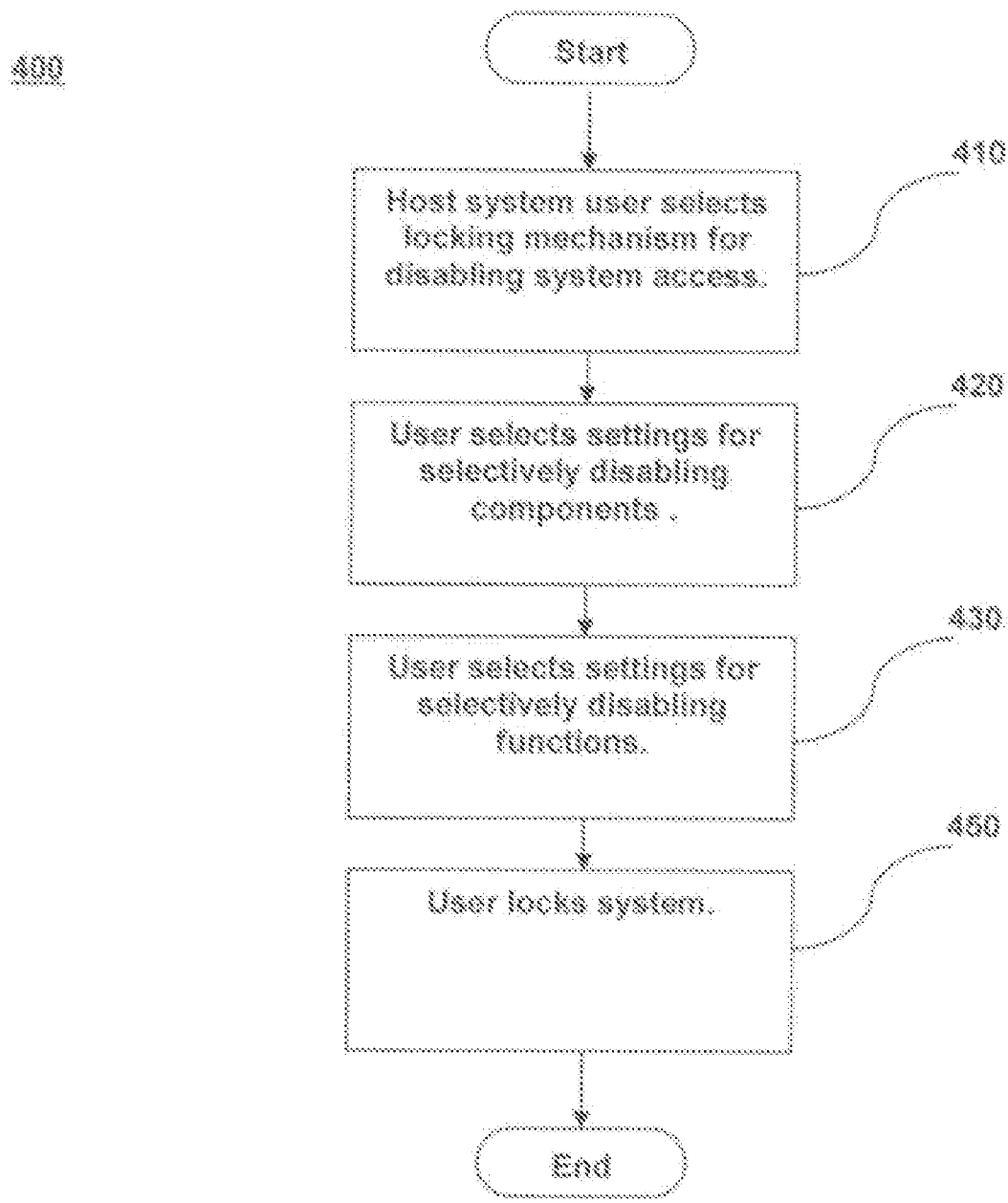
FIG. 4 is a simplified block diagram describing the process of selectively enabling and disabling components, according to an embodiment of the present invention.

Referring to FIG. 4 there is shown a simplified flowchart of the process for selectively enabling and disabling components, according to an embodiment of the present invention. The process begins at step 410 with the user of the host system 180 accessing the component control storage 313 to specify which components should be enabled and which components should be disabled for the host system 180. The components of the host system 180 have to be enabled with additional features that allow these components to either be enabled or disabled.

The enable/disable mechanism 311 is responsible for enabling or disabling the components based on the information in the component control storage 313. Any changes to the component control storage 313 can trigger the enable/disable mechanism 311. The enable/disable mechanism 311 may enable or disable a component by writing and updating an enable register or storage area of the component which in turn triggers the component to actually be enabled or disabled. The enable register is one of the additional features which a component must have in order to be selectively enabled and disabled. The subsystem on the component that determines whether it should be enabled or disabled should always be enabled.

In simpler embodiments the enable/disable mechanism 311 has direct access to the enable register or storage area 313 without requiring additional verification. In more sophisticated embodiments, the method to update the enable register or storage area 313 includes a verification step between the enable/disable mechanism 311 and the component that goes through a set of challenge response sequences to mutually authenticate between the enable/disable mechanism 311 and the component itself. The challenge response sequence could be based on simpler symmetric key cryptography or more secure public key cryptography where a public-private key pair is used for each component and for the enable/disable mechanism 311.

In some embodiments, to provide enhanced security, the key pair could be generated when the component is manufactured and the public key would be published and the private key would not be retrievable from the component. The subsystem of the component that performs the challenge/response function has to be enabled at all times. The enable/disable mechanism 311 and the components may include a microcontroller platform and signed code to help perform this function. The cryptographic keys for the components could be stored in the component control storage area 313.

In another embodiment, the switches 312 are secured physically by a mechanical lock and key 380 to ensure that a user cannot change the positions of these switches without the key. One set of switches 312 can be set to disallow booting from an external device. This, in effect, makes the host system 180 inaccessible to any outside user. Alternatively, the switches 312 can be set to enable booting from an external media such as the CD ROM 314 or booting from the internal hard disk. Some switches 312 may disable the software component controller 315 and not allow it to update the component control storage area 313, thus preventing it from enabling or disabling components in the host system 180. Some switches 312 may also disable the enable/disable mechanism 311 so that a locked configuration cannot be further modified unless the user has access to the key 380 to change the position of the switches 312.

In another embodiment, the software component controller 315 can be used instead of the switches 312 to update the contents of the component control storage 313. The software component controller 315 is a trusted program and has access to update the component control storage area 313. The software component controller 315 can be invoked from a privileged system mode. Examples of such modes include super-user mode, administrator mode, a mode where the BIOS is running, and the like.

Next in step 420 the user of the host system 180 selects which components to enable or disable and which type of settings to employ for the components. The switches 312 can be implemented on the outside of the system 180 as a mechanical lock and master key mechanism 380 that allows the owner to set switches that can enable or disable a particular part of the system 180. Changing a position of a switch 312 can directly update the component control storage 313. In one embodiment the switches 312 are binary-operated and can be set to only one of two positions, open or locked. In another embodiment some three-position switches 312 are used to reduce the total number of switches required. For example, instead of using two switches 312 to specify Read Enable, Read Disable, Write Enable and Write Disable options for a storage component, a single switch may specify Read Enable, Read+Write Enable, Read Disable/WriteDisable. These switches 312 cannot be accessed without a master key.

Switches 312 can be assigned to each of several system 180 controlled components, such as the hard disk 308, BIOS memory 306, CD ROM drive 314, USB slots 322, network interface 318, flash memory 316, wireless interface 326, an integrated camera 320, graphics and game accelerators 324, audio speakers and microphone 328, and the like. One or more master lock positions correspond to commonly used combinations of controlled components and serve as a fast path to facilitate an enablement/disablement technique. One example of this is a position that sets a mode that allows access to USB slots 322, CD ROM 314, and flash memory 316 to a user booting from an external media but disables access to a network.

A possible configuration for the switches 312 is as follows: one switch specifies whether the system 180 is permitted to boot from an external device. There are two sets of switches corresponding to the individual components. One set of switches applies when the system 180 is booted from the internal hard disk. The other set of switches is applicable when the system 180 boots from an external media.

By setting these switches the user can control which portions of the system 180 are accessible to the regular user who boots from the internal hard disk and which portions are accessible to a user who boots the system 180 with their own removable media.

In step 430, the user will then select the settings for selectively disabling any of the functionality of the host system 180. This is done in the same manner as discussed with respect to step 420. Setting a system password can be done at the factory, or a user of the system may be able to set a system password. Password encryption keys may also be set in a manner of different ways. In step 450 the user locks the host system 180.

Figure 5:
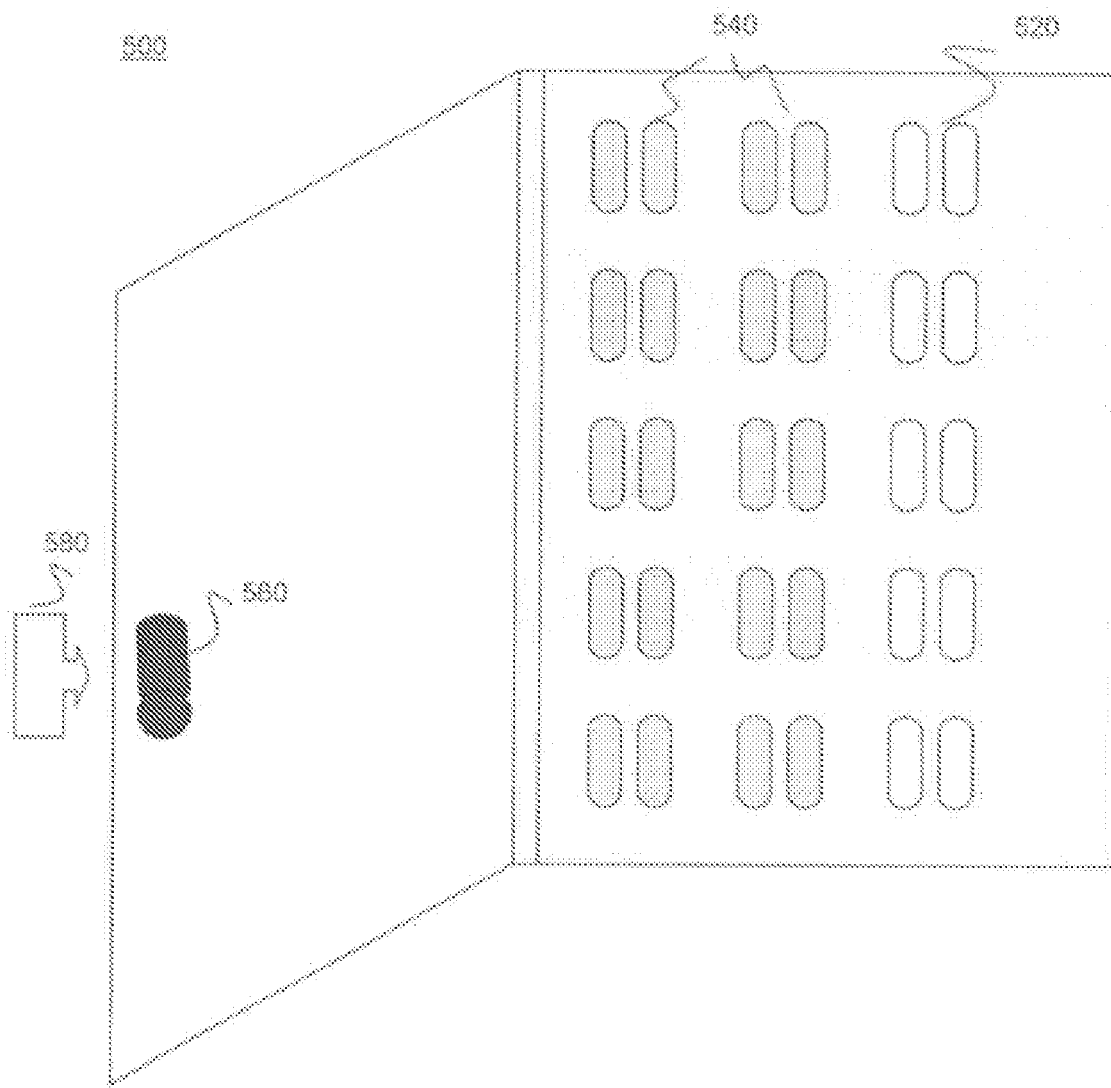
FIG. 5 is an illustration of a lock and key panel according to an embodiment of invention.

In FIG. 5 we show a simplified illustration of an alternative embodiment, for simplicity, wherein the system 180 provides a small set of pre-defined mode configurations that correspond to particular switch settings for the individual components and functions. FIG. 5 shows a lock and key panel inside of a locked console 500 (in the open position). The console 500 comprises switches 520 and 540 that operate much like the switches in a circuit breaker box. Two sets of switches are shown: Grey switches 540 control the components of the system 180 and white switches 520 control the functions of the system 180.

For example, the following modes are possible: Locked Configuration, Firmware-Update Allowed, External-Boot-Allowed, External-Boot-Allowed-Island, External-Boot-Allowed-Island-with-HDD-disabled. As before, changing the mode switch is only possible when a master key 580 is inserted into a key mechanism 560. The mode switch is normally set to the "Locked Configuration" mode when the master key 580 is removed. Without the key 580 the system 180 enclosure cannot be opened or the setting changed.

In the Locked Configuration mode the following restrictions apply:

1. The BIOS and any other firmware on the system 180 is set to read-only (preferably by disabling the Write Enable signal to the Flash or other programmable storage that holds the firmware);

2. BIOS settings cannot be modified;

3. The user is not permitted to choose a temporary boot device, i.e., the PC can boot only from the internal (host) hard disk; and 4. All other system 180 functions are accessible.

The Firmware-Update-Allowed mode is similar to the above but the user is permitted to modify only the firmware.

In the External-Boot-Allowed mode:

1. The user is permitted to choose a temporary boot device;

2. If the PC boots from any removable media, all internal hard-disk partitions, the network interface, CD ROM drive, audio, display, etc. are accessible; and 3. The BIOS cannot be updated when booted from external media.

The External-Boot-Allowed-Island mode is similar to the External-Boot-Allowed mode except that the network interface is made inaccessible when the PC is booted from removable media.

The External-Boot-Allowed-Island-HDD-Disabled mode is similar to the External-Boot-Allowed-Island mode with the additional restriction that the internal HDD is disconnected completely when the switch is in this position.

As is clear from the above, different modes can be selected by choosing the necessary options.

In one alternate software embodiment the locking mechanism comprises the use of a set of system boot passwords that enable a user to enable commonly used components but not other controlled components. The master lock may still be a physical lock if it is determined that users prefer a hardware lock instead of having to remember a password for a software lock.

More specifically, in such an embodiment the technique is to lock the boot process using BIOS passwords, but to permit the owner to assign multiple acceptable BIOS passwords. One of the BIOS passwords is considered the master BIOS password. The rest of the BIOS passwords are user passwords. For each user password there is a particular set of PC functions and components that are disabled. When the master BIOS password is supplied, the settings corresponding to the user BIOS passwords can be changed. When a user level BIOS password is supplied the BIOS settings corresponding to that user cannot be modified. The owner is thus able to specify which components are enabled and thus prevent a guest from having access to one or more components in the host system 180. In this scheme the owner of the host PC 180 can set up a BIOS configuration corresponding to each of the modes and associate these modes with user BIOS passwords. When a guest wants to use the host PC 180, the owner gives the corresponding BIOS password to the guest.

One with knowledge in the art will appreciate that the embodiments as described in relation to a personal computer also apply to PDAs, cell phones, and the like. It should also be known that the method according to an embodiment of the invention can also be implemented as software on the CD ROM 314 or other removable media.

Therefore, while there have been described what are presently considered to be the preferred embodiments, it will be understood by those skilled in the art that other modifications can be made within the spirit of the invention.

We claim:

1. A host information processing system having a plurality of components, the system comprising:
   a processor configured for performing a plurality of functions on the plurality of components of the host information processing system, wherein the plurality of components of the host information processing system are enabled with features for allowing the components to be enabled and disabled from use by a portable device coupled with said host information processing system;
   a memory;
   a locking mechanism comprising:
      a component control storage area comprising mode settings for the locking mechanism that control features of the components, said component control storage area comprising a separate storage section for each of the components in the host information processing system;
      an enable register storage area comprising an enable register for each component that allows said each component to be selectively enabled and disabled;
      an enable/disable mechanism operatively coupled with the processor for enabling and disabling at least some of the components of the host information processing system based on the mode settings in the component control storage area when said host information processing system is used by the portable device, said enabling and disabling by writing and updating the enable register of the component which in turn triggers the component to actually be enabled or disabled;
   wherein the locking mechanism further comprises:
      a first set of switches for disabling at least some of the functions of the host information processing system such that a guest user of the host information processing system using an operating system image stored on the portable device connected to the host information processing system and used to boot the host information processing system, cannot modify any permanent state of the host information processing system; and
      a second set of switches for disabling at least some of the functions of the host information processing system when the host information processing system is booted from an internal hard disk;
   wherein the switches are one of hardware switches and software switches.

2. The system of claim 1 further comprising an authentication mechanism that uses encryption for controlling enabling and disabling.

3. The system of claim 1, wherein the locking mechanism locks the functions of selected components such that the guest user of the host information processing system cannot copy or read any data stored in the host information processing system.

4. The system of claim 1, further comprising a physical lock and key mechanism disposed outside of the host information processing system, the lock and key mechanism comprising a plurality of switches to enable and disable selected components of the host information processing system.

5. The system of claim 3, wherein the locking mechanism comprises:
   a first set of switches for disabling at least some of the functions of the host information processing system such that the guest user of the host information processing system using an operating system image stored on the portable device connected to the host information processing system and used to boot the host information processing system, cannot modify any permanent state of the host information processing system; and
   a second set of switches for disabling at least some of the functions of the host information processing system when the host information processing system is booted from an internal hard disk.

6. The system of claim 5 wherein each switch comprises a read enable position, a read/write enable position, and a read disabled position, and wherein the read enable position enables the guest user to read information stored in the storage device of the host information processing system;
the read/write enable position enables the guest user to read and write information stored in the storage device of the host information processing system, and the read disabled position prohibits the guest user from accessing information stored in the storage device of the host information processing system.

7. The system of claim 1 wherein the locking mechanism comprises a locked configuration mode, the locked configuration mode comprising the following restrictions:
the basic input output system and any other firmware on the host information processing system is set to read-only mode, preferably by disabling the write enable signal to flash memory or other programmable storage that holds the firmware;
basic input output system settings cannot be modified;
the guest user is not permitted to select a temporary boot device so that the host information processing system can boot only from the internal hard disk; and
all other host information processing system functions are accessible, including a network interface.

8. The system of claim 1 wherein the locking mechanism comprises an external-boot-allowed mode wherein:
the guest user is permitted to select the temporary boot device;
when the host information processing system boots from any removable media:
all internal hard-disk partitions, the network interface, compact disk read only memory drive, audio, and display are accessible; and
the basic input output system cannot be updated.

9. The system of claim 1 wherein the locking mechanism comprises an external-boot-allowed mode wherein:
the guest user is permitted to select the temporary boot device;
when the host information processing system boots from any removable media:
a hard-disk is disabled;
the network interface, compact disk read only memory drive, audio, and display are accessible; and
the basic input output system cannot be updated.

10. The system of claim 1 wherein the locking mechanism comprises an external-boot-allowed-island mode wherein:
the guest user is permitted to select the temporary boot device;
when the host information processing system boots from any removable media:
all internal hard-disk partitions, compact disk read only memory drive, audio, and display are accessible;
the basic input output system cannot be updated; and
the network interface is made inaccessible.

11. The system of claim 10 wherein the locking mechanism further comprises an external-boot-allowed-island-hard disk drive-disabled mode with the additional restriction that the internal hard disk drive is disconnected completely when at least one of the plurality of switches is in the external-boot-allowed-island-hard disk drive-disabled position.

12. The system of claim 1 wherein the locking mechanism is software enabled, the locking mechanism comprising a plurality of enable/disable modes.

13. The system of claim 1 wherein the locking mechanism comprises a mechanism that locks the boot process using basic input output system passwords, and permits an owner of the host information processing system to assign multiple acceptable basic input output system passwords.

14. The system of claim 12 wherein the locking mechanism comprises a software component controller for selectively specifying the enabling and disabling of at least some of the components of the host information processing system.

15. An information processing system comprising:
a plurality of components, each component for performing a function of the information processing system, wherein at least some of the components are enabled with features for allowing said components to be enabled and disabled;
a privileged system mode; and
a master access control mechanism for selectively enabling and disabling one or more components of the information processing system when the information processing system is in the privileged system mode, depending on whether the information processing system boots from internal or external media, said master access control mechanism comprising:
a microprocessor configured to perform a plurality of functions on the plurality of components of the information processing system;
a component control storage area that controls features of the components, said component control storage area comprising a separate storage section for each of the components in the information processing system;
an enable register for each component that allows said component to be selectively enabled and disabled;
a locking mechanism for enabling and disabling at least some of the components of the information processing system based on information in the component control storage area so that a guest user of the information processing system using an operating image stored on removable media connected to the information processing system and used to boot the information processing system is restricted to using only those components that have been selectively enabled for the guest user, said enabling and disabling by writing and updating the enable register of the component which in turn triggers the component to actually be enabled or disabled.

16. A set of controls for an information processing system, comprising:
a set of controlled components wherein one or more of the controlled components can be disabled or enabled when the information processing system is active; and
a control mechanism for controlling the controlled components, said control mechanism comprising:
a component control storage area that controls features of the components, said component control storage area comprising a separate storage section for each of the components in the information processing system;
an enable register for each component that allows said component to be selectively enabled and disabled, wherein selectively enabling the component enables a processor to perform functions on said component;
a locking mechanism for enabling and disabling at least some of the components of the information processing system based on information in the component control storage area so that a guest user of the information processing system using an operating image stored on removable media connected to the information processing system and used to boot the information processing system is restricted to using only those components that have been selectively enabled for the guest user, said enabling and disabling by writing and updating the enable register of the component which in turn triggers the component to actually be enabled or disabled;

wherein the locking mechanism comprises:

a first set of switches for disabling at least some of the functions of the information processing system such that the guest user of the information processing system using an operating system image stored on removable media connected to the information processing system and used to boot the information processing system, cannot modify any permanent state of the information processing system; and a second set of switches for disabling at least some of the functions of the information processing system when the information processing system is booted from an internal hard disk.

17. A computer-implemented method for selectively enabling and disabling at least one of a plurality of functions of a host operating system and for selectively enabling and disabling at least one of a plurality of host components, the method comprising steps of:

activating a locking mechanism in the host operating system for disabling access to a host component, wherein the locking mechanism comprises:

a component control storage area comprising mode settings that control features of the components, said component control storage area comprising a separate storage section for each of the components in the host processing system;

an enable register storage area comprising an enable register for each component;

an enable/disable mechanism for enabling and disabling at least some of the components of the host operating system based on the mode settings in the component control storage area so that a guest user of the host operating system using an operating image stored on removable media connected to the host operating system and used to boot the host operating system is restricted to using only those components that have been selectively enabled for the guest user, said enabling and disabling by writing and updating the enable register of the component which in triggers the component to actually be enabled or disabled; and switches comprising:

a first set of switches for disabling at least some of the functions of the host operating system such that the guest user of the host operating system using an operating system image stored on removable media connected to the host operating system and used to boot the host operating system, cannot modify any permanent state of the host operating system; and a second set of switches for disabling at least some of the functions of the host operating system when the host operating system is booted from an internal hard disk;

activating the mode settings for selectively enabling and disabling components of the host operating system, wherein the component settings are controlled by manipulating the switches, wherein selectively enabling the component enables a processor to perform functions on said component;

activating system settings for selectively enabling and disabling functions of the host operating system, wherein the system settings are controlled by manipulating the switches;

activating system passwords, component passwords and encryption keys; and locking the host operating system according to the selected settings.

18. The computer-implemented method of claim 17 wherein the switches are software switches.

* * * * *